United States Patent Office 2,718,511
Patented Sept. 20, 1955

2,718,511

SOLUTION OF POLYMERIC CHLOROTRIFLUORO-ETHYLENE

Murray M. Sprung and Frederick O. Guenther, Schenectady, N. Y., assignors to General Electric Company, a corporation of New York No Drawing. Application November 25, 1949, Serial No. 129,534

21 Claims. (Cl. 260—33.8)

This invention is concerned with solutions of polymeric chlorotrifluoroethylene. More particularly, this invention relates to a solution comprising (1) polymeric chlorotrifluoroethylene dissolved in (2) a fluorinated organic compound having a boiling point above 110° C. and selected from the class consisting of (a) nuclearly fluorinated aromatic hydrocarbons containing two aromatic nuclei free of other substituents, (b) halogenated (e. g., chlorinated, brominated, etc.) derivatives of lower alkyl-substituted (e. g., methyl, ethyl, propyl, isopropyl, and butyl) aromatic hydrocarbons containing fluorine (e. g., from 1 to 6 or more fluorines) in the alkyl substituent, (3) fluorinated-chlorinated aliphatic hydrocarbons of the $C_3$ and $C_4$ series containing at least two chlorine atoms (e. g., from 2 to 6), (d) liquid low molecular weight polymers of chlorotrifluoroethylene having the recurring structural unit $(CF_2—CFCl)_n$ where $n$ is an integer equal to from 4 to 16, inclusive, and (e) mixtures of the foregoing fluorinated organic compounds.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance, high flow point, and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene but these have generally been unsuccessful because the limit of solubility of the polymeric chlorotrifluoroethylene in the solvent has been so small as to render it impractical.

We have now discovered that we are able to make solutions of polymeric chlorotrifluoroethylene (any solid polymer thereof can be employed) whereby it is possible to obtain concentrations of the latter polymer in the solution in sufficiently large amounts as to make them useful in many coating and impregnating applications. By means of our invention it is possible to obtain solutions containing at least 10 per cent, by weight, solids of the polymeric chlorotrifluoroethylene, whereas formerly the solubility of the polymer in other solvents has been negligible.

In addition to the advantages described above for our invention, we have also found that such solutions are accompanied by still further advantages. Among these are the ability to deposit more uniform and more homogeneous coatings on such materials as electrical conductors, particularly magnet wire. In addition, these hot solutions have an advantage over the use of dispersions of polymeric chlorotrifluoroethylene since, by means of application of a polymer from hot solutions, the deposited film is continuous and requires no fusion at elevated temperatures to cause coalescence of the coating. When employing dispersions, high temperatures are necessary to cause fusion of the individual particles which, although closely packed together, are nevertheless not continuous. Also, when applying coatings on magnet wire by means of the above-described solutions, conventional magnet wire dies can be used, permitting a more uniform build-up of film thickness. Finally, because of the lower temperatures at which coating of various materials can be effected, thermal effects on the polymer are minimized.

It was entirely unexpected and in no way could have been predicted that the class of compounds mentioned above were good solvents for the polymeric chlorotrifluoroethylene when analogous compounds such as, for instance, 2,3-dichloro-hexafluorobutene (boiling point 67° C.), fluorobenzene, p-bromofluorobenzene, p-fluoroanisole, benzotrifluoride, hexafluoroxylene, etc., had no solvent effect on the polymer, even at the boiling point of the solvents.

In accordance with our invention, we prepare a mixture of finely divided polymeric chlorotrifluoroethylene and the fluorinated organic compound of the class mentioned previously, and heat the mixture at a temperature sufficiently high to cause the polymer to dissolve in the solvent. Generally, we have found that solution in the particular class of solvents employed herein takes place at temperatures of the order of from about 110° to 180° C. or higher, depending on the type of solvent used. By maintaining these solutions at the temperatures at which solution of the polymer has taken place, we are able to employ these solutions in the same manner as solutions of other better-known polymers. If the temperature is allowed to drop much below the solution temperature, small amounts of the polymer will begin to settle out. Despite this, however, this is believed to be the first time that it has been possible to obtain solutions of such high concentrations of the polymeric chlorotrifluoroethylene even at elevated temperatures.

The fluorinated organic compounds employed in the practice of the present invention may be generally classified under four headings. One group comprises the simple fluorinated aromatic hydrocarbons containing two aromatic nuclei, free of other substituents such as alkyl groups, amino groups, etc. These include such compounds as, for instance, alpha-fluoronaphthalene, o-fluorobiphenyl, m-fluorobiphenyl, p-fluorobiphenyl, beta-fluoronaphthalene, fluorofluorene, bis-(3,3'-trifluoromethyl) diphenyl ether, difluoronaphthalene, difluorobiphenyl, etc. The particular virtue of these solvents lies in the fact that they have relatively high boiling points (around 175–275° C.) so that they are relatively non-volatile at the solution temperatures. At the same time their solution temperatures are appreciably lower than those noted for most esters and for many aromatic hydrocarbons. Thus, in the case of alpha-fluoronaphthalene, a ten per cent solution of polymeric chlorotrifluoroethylene was obtained at 193° C., and from this solution the polymer could be recovered in substantially quantitative yield and essentially unaltered in physical and chemical characteristics. This is in contrast to instances where other types of non-fluorinated solvents have been employed with polymeric chlorotrifluoroethylene where it has been noted that the solvent has to some extent affected the physical and chemical characteristics of the polymer.

Still another class of fluorinated organic compounds which may be employed are, for instance, halogenated derivatives of lower alkyl-substituted aromatic hydrocarbons containing fluorine in the alkyl substituent, examples of which are, for instance, chlorobenzotrifluoride, dichlorobenzotrifluoride, chloro-bis-trifluoromethylbenzene, alpha, alpha-dichloro-beta, beta, difluoroethylbenzene, alpha, alpha-difluoro-alpha-chloro toluene, ortho-bromobenzotrifluoride, etc. Solution temperatures for these liquids, assuming that an approximate ten per cent, by weight, solution of the polymeric chlorotrifluoroethylene is desired, are relatively low, that is, as, for example, low as 110° to 130° C.

Another class of fluorinated organic liquids which has been found eminently suitable in preparing the claimed solutions comprises fluorinated-chlorinated aliphatic hydrocarbons of the $C_3$ and $C_4$ series containing at least two chlorine atoms. Among such compounds may be mentioned 1-fluoro-2-methyl-1,1,2-trichloropropane; 1,1-difluoro - 2 - methyl - 1,2,3,3 - tetrachloropropane; 1,1-difluoro - 2 - methyl - 1,2,3 - trichloropropane; hexachloro - 1,2,3,4 - tetrafluorobutane; 1,1,1,4,4,4 - hexafluoro - tetrachlorobutane; 3 - fluoropentachloropropene-1; 3,3 - difluorotetrachloropropene - 1; 1,1 - difluoro - 1,2,-2,3,3 - pentachloropropane; 1,3 - difluorohexachloropropane; 1,1,2,3 - tetrachloro - 2,3,3 - trifluoropropane; pentachloro - 1,3,3 - trifluoropropane; pentachloro - 3,3,3 - trifluoropropane; tetrachloro - 1,1,3,3 - tetrafluoropropane, etc.

A still further class of fluorinated organic compounds which has been found suitable as solvents for polymeric chlorotrifluoroethylene, comprises liquid, low molecular weight polymers of chlorotrifluoroethylene having the recurring structural unit $(CF_2—CFCl)_n$ where $n$ is an integer equal to from 4 to 16. In this category fall low molecular weight liquid polymers of chlorotrifluoroethylene (known as "Fluorolubes" and made by the Hooker Electrochemical Company) obtained by chain stopping, with chloroform or carbon tetrachloride, the catalyzed polymerization of chlorotrifluoroethylene. The distillate from the reaction product

[essentially $H(CClFCF_2)_xCCl_3$]

is then stabilized by fluorination with, for instance, $CoF_3$, to give mainly products, such as $F(CClFCF_2)_xCClF_2$, where $x$ averages around 12.

We have found also that we can employ mixtures of many of the foregoing solvents advantageously or many of the individual solvents mixed with non-solvents, some of the latter of which show desirable eutectic solution temperatures. With regard to mixtures of fluorinated solvents for the polymeric chlorotrifluoroethylene, it has been found that in general they dissolve the polymer at temperatures between the solution temperatures of the individual components. In certain cases it was found, however, that some mixtures were observed to dissolve the polymer at temperatures lower than the solution temperature of either component alone. This was especially evident when chain-stopped, low molecular weight polymeric chlorotrifluoroethylene was one of the constituents in the mixture. Solvents which by themselves dissolve the polymer below about 130° C., in general, do not exhibit this phenomenon, but most solvents which by themselves dissolve the polymer about 130° C. show a minimum in the solubility temperature composition curve. This type of mixture can be of practical significance because it makes possible the use of a high per cent of a low cost solvent at a reasonably low temperature.

In order that those skilled in the art may better understand how the present invention may be practiced, the following examples are given by way of illustration and not by way of limitation. In each case sufficient polymer and solvent (or mixture of solvents) were employed so that there was obtained a ten percent solution of the polymer in the particular solvent. Generally, the procedure for making the various solutions was the same in each of the following examples. This comprised first mixing the polymeric chlorotrifluoroethylene (no strength temperature of 240° C.) with the particular solvent (or solvents). Thereafter, the mixture was placed in a high temperature oil bath and the temperature slowly raised while stirring continuously until solution of the polymer in the solvent occurred. The temperature at which solution took place and the temperature at which precipitation began to occur are noted in each of the examples for the respective solvents employed.

EXAMPLE 1

This example illustrates the kind of solutions which can be obtained by employing as the solvent fluorinated aromatic hydrocarbons.

*Table I*

| Compound | B. P./760 mm. (° C.) | For 10% Solutions | |
|---|---|---|---|
| | | Solution Temp. (° C.) | Precipitation Temp. (° C.) |
| o-chlorobenzotrifluoride | 152 | 123 | 103 |
| m-chlorobenzotrifluoride | 138 | 120 | 101 |
| p-chlorobenzotrifluoride | 139 | 119 | 102 |
| dichlorobenzotrifluorides (mixed isomers) | 171 | 121 | 106 |
| o-bromobenzotrifluoride | 153 | 130 | 112-115 |
| alpha,alpha-dichloro-beta,beta-difluoro-ethyl benzene | 208 | 171 | 169 |
| alpha,alpha - difluoro - alpha - chloro - toluene | 142 | 122 | 108 |
| alpha-fluoronaphthalene | 212 | 193 | 189 |
| o-fluorobiphenyl | 245-250 | 245 | 240 |

EXAMPLE 2

In this example various fluorinated aliphatic compounds of the propane and butane series were employed for making approximately ten per cent solutions of a polymeric chlorotrifluoroethylene. The following table shows the solution temperature of such mixtures as well as temperature at which precipitation of the polymer was observed.

*Table II*

| Compound | B. P./760 mm. (° C.) | For 10% Solutions | |
|---|---|---|---|
| | | Solution Temp. (° C.) | Precipitation Temp. (° C.) |
| 3-fluoropentachloropropene-1 | 167 | 134-138 | 123 |
| 3,3-difluorotetrachloropropene-1 | 127 | 118 | 100 |
| 1,1-difluoro-1,2,2,3,3-pentachloropropane | 167 | 119 | 100 |
| 1,3-difluorohexachloropropane | 190 | 123 | 111 |
| 1,1,2,3-tetrachloro-2,3,3-trifluoropropane | 129 | 112 | 90-98 |
| pentachloro-1,3,3-trifluoropropane | 150 | 111 | 95 |
| pentachloro-3,3,3-trifluoropropane | 155 | 114 | 97 |
| tetrachloro-1,1,3,3-tetrafluoropropane | 115 | 110-112 | 97-105 |
| 1-fluoro-2-methyl-1,1,2-trichloropropane | 125-130 | 123 | 115 |
| 1,1-difluoro-2-methyl-1,2,3,3-tetrachloropropane | 185-190 | 124 | 112 |
| 1,1-difluoro-2-methyl-1,2,3-trichloropropane | 125-130 | 129 | 112 |
| hexachloro-1,2,3,4-tetrafluorobutane | 210 | 120 | 100-110 |
| 1,1,1,4,4,4-hexafluorotetrachlorobutane | 135 | 118-121 | 94-97 |

EXAMPLE 3

In this example mixtures of many of the fluorinated organic compounds described above, as well as mixtures of the aforementioned fluorinated organic compounds, with nonsolvents for the polymeric chlorotrifluoroethylene, were employed in making solutions of the polymer. Following is a table showing the relationship of these various ingredients.

Table III

| Solvent A | Wt. Percent | Solvent B | Wt. Percent | Minimum Solution Temp. (° C.) | Precipitation Temp. (° C.) |
|---|---|---|---|---|---|
| o-chlorobenzotrifluoride | 100 | naphthalene[a] | 0 | 123 | 103 |
| Do | 75 | do | 25 | 134–137 | 112 |
| Do | 50 | do | 50 | 152–155 | 145 |
| hexachloro-1,2,3,4-tetrafluorobutane | 50 | do | 50 | 165 | 164 |
| Do | 25 | do | 75 | 205 | 204 |
| alpha-fluoro-naphthalene | 100 | do | 0 | 193 | 189 |
| Do | 75 | do | 25 | 203 | 200 |
| Do | 50 | do | 50 | 213 | 212 |
| difluoropentachloropropane[b] | 0 | o-chlorobenzo-trifluoride | 100 | 123 | 103 |
| Do | 25 | do | 75 | 119 | 99 |
| Do | 50 | do | 50 | 118 | 97 |
| Do | 100 | do | 0 | 119 | 100 |
| Do | 25 | Fluorolube | 75 | 137 | 126 |
| Do | 50 | do | 50 | 127 | 112 |
| Do | 75 | do | 25 | 120 | 105 |
| o-chlorobenzotrifluoride | 87.5 | cyclohexanone[a] | 12.5 | 125 | 115 |
| Do | 75 | do | 25 | 136 | 123 |
| Do | 62.5 | do | 37.5 | 147 | 143 |
| Do | 87.5 | diisobutyl ketone[a] | 12.5 | 135 | 115 |
| Do | 75 | do | 25 | 144 | 138 |
| o-fluorobiphenyl | 40 | Fluorolube | 60 | 135–140 | 125 |
| o-chlorobenzotrifluoride | 87.5 | 2-methyl-1,4-pentanediol[a] | 12.5 | 143 | 139 |
| 1,3-difluorohexachloropropane | 75 | naphthalene | 25 | 138 | 122 |
| Do | 50 | do | 50 | 175 | 170 |
| difluoropenta-chloropropane | 87.5 | alpha-fluoro-naphthalene | 12.5 | 124 | 108 |
| Do | 75 | do | 25 | 130 | 114 |
| Do | 62.5 | do | 37.5 | 137 | 122 |
| Do | 37.5 | do | 62.5 | 156 | 152 |
| Do | 25 | do | 75 | 168 | 165 |
| Do | 12.5 | do | 87.5 | 181 | 177 |
| Do | 75 | o-fluorobiphenyl | 25 | 136 | 120 |
| Do | 87.5 | do | 12.5 | 128 | 110 |
| 1-fluoropenta-chloropropene | 225 | Fluorolube | 75 | 138 | 127 |
| Do | 50 | do | 50 | 130 | 116 |
| Do | 75 | do | 25 | 130 | 116 |
| alpha, alpha-dichloro-beta, beta-difluoroethyl-benzene. | 25 | do | 75 | 144 | 127 |
| Do | 50 | do | 50 | 136 | 120 |
| Do | 75 | do | 25 | 147 | 128 |
| alpha-fluoro-naphthalene | 12.5 | do | 87.5 | 139 | 123 |
| Do | 50 | do | 50 | 134 | 115 |
| Do | 75 | do | 25 | 150 | 147 |
| Fluorolube | 75 | naphthalene | 25 | 130 | 112 |
| Do | 50 | do | 50 | 138 | 132 |
| Do | 25 | do | 75 | 190 | 186 |
| Do | 75 | octachloro-propane | 25 | 142 | 135 |
| Do | 50 | do | 50 | 136 | 130 |
| Do | 75 | biphenyl | 25 | 140 | 127 |
| Do | 50 | do | 50 | 164 | 160 |

[a] Non-solvent at its boiling point.
[b] 1,1-difluoro-1,2,2,3,3-pentachloropropane.

EXAMPLE 4

In this example various types of low molecular weight liquid polymeric chlorotrifluoroethylene were used as solvents for making a solution of the higher molecular weight solid polymeric chlorotrifluoroethylene (having a no strength temperature of the order of about 240° C.). It was found that the low molecular weight liquid polymeric chlorotrifluoroethylene dissolved ten per cent, by weight, of the latter within a range of temperatures varying from about 137° C. to approximately 170° C.

It will, of course, be apparent to those skilled in the art that in addition to the compositions described above, other fluorinated organic compounds, many examples of which have been given previously, may be employed in place of those listed in the foregoing examples without departing from the scope of the invention. In addition, where mixtures of fluorinated organic compounds or mixtures of the latter with non-solvents are employed, they may be used within wide ranges of concentration depending upon such factors as the type of fluorinated organic compound used, the type of non-solvent employed, the per cent of solubility of polymer desired, etc. In general, it is desirable that the fluorinated organic compound comprise at least 20 per cent, by weight, for instance, from 25 to 95 per cent, preferably from 25 to 75 per cent, by weight, of the mixture of solvents in order to keep the solution temperature and precipitation temperature as low as possible and also to maintain the viscosity of the solution sufficiently low to make it useful in general coating and impregnating applications.

Although the foregoing examples are all concerned with making solutions having a concentration of ten per cent, by weight, of the polymeric chlorotrifluoroethylene, it will, of course, be apparent to those skilled in the art that lower or higher concentrations of the polymer may also be employed. Thus, we may prepare solutions varying in concentration from about one to twenty per cent, by weight, of polymer based on the total weight of the solution. In such cases where lower concentrations of the polymer are desired, it will be found that somewhat lower temperatures of solution and of precipitation will be encountered while the converse, that is, somewhat higher temperatures of solution and precipitation, may be needed when the concentration of the polymer rises substantially above ten per cent.

In addition to the requirement for higher solution temperatures where concentrations greater than ten per cent of polymer are desired, it will be noted that the viscosity of the solution will also begin to increase materially. However, in many instances this disadvantage can be obviated by raising the temperature of the solution (if the solvent permits this) to a point where a satisfactory viscosity is attained. All these factors which have been mentioned above can be balanced to give solutions of polymeric chlorotrifluoroethylene which have satisfactory concentration of polymer, viscosity, and operating temperature range.

The claimed solutions have utility in many applications and may be employed in various ways. They may be used to coat and impregnate various fillers, such as, for example, glass cloth, glass batting, asbestos cloth or asbestos floats, mica, etc. In addition, the solutions are advantageously employed for coating electrical conductors to give heat resistance and chemical resistant insulations for such conductors. If desired, molding compositions may be advantageously prepared by adding various inorganic fillers to obtain a homogeneous mixture and thereafter removing the solvent from the mixture. Laminated products may also be prepared by coating and impregnating sheet material with the solutions and superposing layers of the impregnated and coated material and pressing the total assembly under heat and pressure (after the solvent has been removed from the treated sheet material), thereby to cause fusing of the polymer and to give a homogeneous article.

We have also found that certain fluorinated esters, particularly, ethyl-alpha,alpha,beta-trichloro-beta,beta-difluoropropionate has good dissolving properties for high polymeric chlorotrifluoroethylene. A 10 per cent solution of this polymer can be made by heating the mixture of ingredients to about 170° C.

What we claim as new and desire to secure by Letters Patent of the United States is:

1. A liquid solution comprising (1) a solute phase comprising essentially solid polychlorotrifluoroethylene and (2) a solvent phase maintained at the temperature at which solution of the aforesaid polymer takes place and comprising a fluorinated organic compound having a boiling point above 110° C., the aforesaid solvent phase being selected from the class consisting of (a) nuclearly fluorinated aromatic hydrocarbons containing two aromatic nuclei free of other substituents, (b) halogenated lower alkyl-substituted aromatic hydrocarbons containing fluorine in the alkyl substituent, (c) fluorinated-chlorinated aliphatic hydrocarbons of the $C_3$ and $C_4$ series containing at least two chlorine atoms, (d) lower molecular weight polymers of chlorotrifluoroethylene having the recurring structural unit $(CF_2-CFCl)_n$ where $n$ is an integer equal to from 4 to 16, inclusive, and (e) mixtures of the foregoing fluorinated organic compounds, the polychlorotrifluoroethylene comprising from 1 to 20%, by weight, of the total weight of (1) and (2).

2. A liquid solution comprising (1) a solute phase comprising essentially solid polychlorotrifluoroethylene and (2) a solvent phase maintained at the temperature at which solution of the aforesaid polymeric material takes place and comprising liquid lower molecular weight polymers of chlorotrifluoroethylene having the recurring structural unit $(CF_2-CFCl)_n$ where $n$ is an integer equal to from 4 to 16, inclusive, the polychlorotrifluoroethylene comprising from 1 to 20%, by weight, of the total weight of (1) and (2).

3. A liquid solution comprising (1) a solute phase comprising essentially solid polychlorotrifluoroethylene and (2) a solvent phase maintained at the temperature at which solution of the aforesaid polymer takes place comprising a halogenated lower alkyl-substituted aromatic hydrocarbon containing fluorine in the alkyl substituent, the polychlorotrifluoroethylene comprising from 1 to 20%, by weight, of the total weight of (1) and (2).

4. A liquid solution comprising (1) a solute phase comprising essentially solid polychlorotrifluoroethylene and (2) a solvent for (1) maintained at the temperature at which solution of the aforesaid polymer takes place and comprising a fluorinated-chlorinated aliphatic hydrocarbon of the $C_3$ and $C_4$ series containing at least two chlorine atoms, the polychlorotrifluoroethylene comprising from 1 to 20%, by weight, of the total weight of (1) and (2).

5. A liquid solution comprising (1) a solute phase comprising essentially solid polychlorotrifluoroethylene and (2) a solvent phase maintained at a temperature at which the aforesaid polymeric material takes place and comprising a liquid lower molecular weight polymer of chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (1) and (2).

6. A liquid solution comprising (1) a solute phase comprising essentially solid polychlorotrifluoroethylene and (2) a solvent phase maintained at the temperature at which solution of the aforesaid polymer takes place and comprising a chlorobenzotrifluoride, the polychlorotrifluoroethylene comprising from 1 to 20%, by weight, of the total weight of (1) and (2).

7. A liquid solution comprising (1) a solute phase comprising essentially solid polychlorotrifluoroethylene and (2) a solvent phase maintained at the temperature at which solution of the aforesaid polymer takes place and comprising, 1,1 - difluoro - 1,2,2,3,3 - pentachloropropane, the polychlorotrifluoroethylene comprising 1 to 20%, by weight, of the total weight of (1) and (2).

8. A liquid solution comprising (1) a solute phase comprising essentially solid polychlorotrifluoroethylene and (2) a solvent phase maintained at the temperature at which solution of the aforesaid polymer takes place and comprising o-chlorobenzotrifluoride, the polychlorotrifluoroethylene comprising from 1 to 20%, by weight, of the total weight of (1) and (2).

9. A liquid solution comprising (1) a solute phase comprising essentially solid polychlorotrifluoroethylene and (2) a solvent phase maintained at the temperature at which solution of the aforesaid polymer takes place and comprising (a) o-fluorobiphenyl and (b) a liquid lower molecular weight polymeric chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (1) and (2).

10. A liquid solution comprising (1) a solute phase comprising essentially solid polychlorotrifluoroethylene and (2) a solvent phase maintained at the temperature at which solution of the aforesaid polymer takes place and comprising (a) 1,1-difluoro-1,2,2,3,3-pentachloropropane and (b) a liquid lower molecular weight polymeric chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (1) and (2).

11. A liquid solution comprising (1) a solute phase comprising essentially solid polymeric chlorotrifluoroethylene and (2) a solute phase maintained at the temperature at which solution of the aforesaid polymer takes place and comprising (a) o-chlorobenzotrifluoride and (b) naphthalene, the polychlorotrifluoroethylene comprising from 1 to 20%, by weight, of the total weight of (1) and (2).

12. The method which comprises (1) forming a liquid mixture of ingredients comprising (A) finely divided solid polychlorotrifluoroethylene and (B) a fluorinated organic compound having a boiling point above 110° C. and selected from the class consisting of (a) nuclearly fluorinated aromatic hydrocarbons containing two aromatic nuclei free of other substitutents, (b) halogenated lower alkyl-substituted aromatic hydrocarbons containing fluorine in the alkyl substituent, and (c) fluorinated-chlorinated aliphatic hydrocarbons of the $C_3$ and $C_4$ series containing at least two chlorines, and (d) liquid low molecular weight polymers of chlorotrifluoroethylene having the recurring structural unit $(CF_2-CFCl)_n$ where $n$ is an integer equal to from 4 to 16, inclusive and (e) mixtures of the foregoing fluorinated compounds, the polychlorotrifluoroethylene comprising from 1 to 20%, by weight, of the total weight of (A) and (B), and (2) heating the mixture of ingredients at an elevated temperature until solution of the polymer in the solvent takes place.

13. The method which comprises (1) forming a liquid mixture of ingredients comprising (A) finely divided solid polychlorotrifluoroethylene and (B) a liquid lower molecular weight polymer of chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (A) and (B), and (2) heating the mixture of ingredients at an elevated temperature until solution of the polymer in the solvent takes place.

14. The method which comprises (1) forming a liquid mixture of ingredients comprising (A) finely divided solid polychlorotrifluoroethylene and (B) o-chlorobenzotrifluoride, the polychlorotrifluoroethylene comprising from 1 to 20%, by weight, of the total weight of (A) and (B), and (2) heating the mixture of ingredients at an elevated temperature until solution of the polymer in the solvent takes place.

15. The method which comprises (1) forming a liquid mixture of ingredients comprising (A) finely divided solid polychlorotrifluoroethylene and (B) 1,1-difluoro-1,2,2,3,3-pentachloropropane, the polychlorotrifluoroethylene comprising from 1 to 20%, by weight, of the total weight of (A) and (B), and (2) heating the mixture of ingredients at an elevated temperature until solution of the polymer in the solvent takes place.

16. The method which comprises (1) forming a liquid mixture of ingredients comprising (A) finely divided solid polychlorotrifluoroethylene and (B) o-fluorobiphenyl and a liquid lower molecular weight polymer of chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (A) and (B), and (2) heating the mixture of ingredients at an elevated temperature until solution of the polymer in the solvent takes place.

17. The method which comprises (1) forming a liquid mixture of ingredients comprising (A) finely divided solid polychlorotrifluoroethylene and (B) 1,1-difluoro-1,2,2,3,3-pentachloropropane and a liquid lower molecular weight polymeric chlorotrifluoroethylene having the recurring structural unit $(CF_2-CFCl)_n$ where $n$ is an integer equal to an average value of about 12, the polychlorotrifluoroethylene comprising from 1 to 20%, by weight, of the total weight of (A) and (B), and (2) heating the mixture of ingredients at an elevated temperature until solution of the polymer in the solvent takes place.

18. The method which comprises (1) forming a liquid mixture of ingredients comprising (A) finely divided solid polychlorotrifluoroethylene and (B) o-chlorobenzotrifluoride, the polychlorotrifluoroethylene comprising from 1 to 20%, by weight, of the total weight of (A) and (B), and (2) heating the mixture of ingredients at an elevated temperature until solution of the polymer in the solvent takes place.

19. A liquid solution comprising (1) a solute phase comprising essentially solid polychlorotrifluoroethylene and (2) a solvent phase, maintained at the temperature at which solution of the aforesaid polymer takes place, comprising a perfluorinated chlorinated saturated hydrocarbon of the $C_3$ and $C_4$ series containing at least two chlorine atoms.

20. A composition comprising a solid homopolymer of chlorotrifluoroethylene and a chlorobenzotrifluoride having the formula

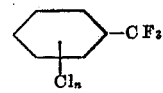

where $n$ represents a number from 1 to 2, said composition being maintained at the temperature at which solution of the aforesaid polymer takes place.

21. A method for preparing a solution of a solid polymer of chlorotrifluoroethylene which comprises admixing finely divided solid polymer of chlorotrifluoroethylene with a perfluorinated, chlorinated, saturated hydrocarbon of the $C_3$ and $C_4$ series containing at least two chlorine atoms in an amount sufficient to maintain the concentration of the solid polymer less than 10 weight per cent and heating the mixture until solution of the polymer in the solvent takes place.

References Cited in the file of this patent

UNITED STATES PATENTS

| | | |
|---|---|---|
| 2,420,222 | Benning et al. | May 6, 1947 |
| 2,510,078 | Compton et al. | June 6, 1950 |
| 2,510,112 | Holbrook | June 6, 1950 |

OTHER REFERENCES

Technical Bulletin "1–12–49," p. 1, KEL–F—Physical and Mechanical Properties, pages 1 and 2. Published by Chemical Manufacturing Division, The M. W. Kellogg Co., P. O. Box 469, Jersey City 3, N. J.